United States Patent [19]

Lashyro et al.

[11] Patent Number: 5,181,598
[45] Date of Patent: Jan. 26, 1993

[54] ARTICLE ROTATING ASSEMBLY

[75] Inventors: Jeffrey A. Lashyro, Crosby; Robert J. Bitner, Nisswa, both of Minn.

[73] Assignee: Riverwood International Corporation, Denver, Colo.

[21] Appl. No.: 771,151

[22] Filed: Oct. 3, 1991

[51] Int. Cl.⁵ .................................. B65G 47/24
[52] U.S. Cl. ........................................ 198/377
[58] Field of Search .................. 198/377, 378, 416

[56] References Cited

U.S. PATENT DOCUMENTS

| | | | |
|---|---|---|---|
| 2,751,730 | 6/1956 | Gentry | 53/32 |
| 3,225,510 | 12/1965 | Jones et al. | 53/48 |
| 3,269,516 | 8/1966 | Lucas | 198/377 |
| 3,885,825 | 5/1975 | Amberg et al. | 198/377 |
| 4,100,715 | 6/1978 | Ganz | 53/48 |
| 4,530,694 | 7/1985 | Kobler et al. | 198/377 |
| 4,802,324 | 2/1989 | Everson | 53/398 |
| 4,977,729 | 12/1990 | Fischer | 198/377 |
| 5,036,644 | 8/1991 | Lashyro et al. | 53/398 |

Primary Examiner—Joseph E. Valenza
Attorney, Agent, or Firm—Joel D. Skinner; Anthony G. Eggink

[57] ABSTRACT

An article rotating assembly and process for rotating articles to a predetermined orientation on a moving conveyor. The assembly comprises movable article control structures and cooperating vertical motion and rotational motion assemblies which are synchronized with the conveyor. Each article control structure is constructed and arranged for vertical and rotational movement above the moving conveyor and is controlled by cam follower and guide track structures to engage and rotate articles on the moving conveyor to a predetermined orientation.

18 Claims, 7 Drawing Sheets

ARTICLE ROTATING ASSEMBLY

BACKGROUND OF THE INVENTION

This invention relates generally to an article rotating assembly and particularly to a machine assembly to rotate article or article groups on a moving conveyor. More particularly, this invention relates to an article rotating assembly and process to rotate article groups on a conveyor in a packaging operation.

The article rotating assemblies of this invention are for engaging and rotating articles to a predetermined orientation on a moving conveyor and are designed for use with associated devices. Particularly, the article rotating assemblies of this invention are designed for use with synchronized packaging related equipment. For example, the article rotating assembly is useful in a packaging carton closure operation to rotate products or product groups to a specified orientation on a conveyor to expose predetermined carton portions, such as end flaps, for a subsequent closure operation positioned adjacent the conveyor.

Various machine assemblies and processes have been proposed in the art to manipulate articles or article groups in continuous packaging operations. Further, various types of packaging structures, such as carton sleeves or preassembled basket style cartons have been proposed for use in continuous packaging operations. However, most of these packaging operations relate to machine assemblies and packaging structures which involve the filling, wrapping, and closure of packaging structures as the articles or article groups are moved in line on a conveyor. Thus, the fixed orientation of the articles or article groups on the conveyor limits the available access for further processing. This limitation exists, particularly, to those article areas that are not outwardly exposed or accessible from locations adjacent the conveyor. As a result of these limitations, specific and complex packaging structures and associated packaging machinery are typically utilized in the packaging art to provide for high speed continuous packaging operations.

For example, Applicants assignee, discloses in U.S. Pat. No. 4,802,324 a vertical cartoning assembly and method for placing and assembling cartons over preselected product groups on a conveyor. The carton structures utilized in that packaging operation are partially erected basket style cartons having an opened bottom which are lowered over the moving product groups. In Applicants assignee's U.S. Pat. No. 5,036,644 a continuous packaging sleever assembly and process are disclosed wherein packaging sleeves are wrapped about preselected product groups. Both of these assemblies and processes involve the manipulation of packaging groups which have a fixed orientation with respect to the conveyor. As a result, the configuration of the packaging structures are predetermined and the associated packaging machinery is, likewise, limited in operation.

The article rotating assembly of this invention engages and rotates articles or article groups on a conveyor so that a plurality of predetermined areas are exposed and made accessible from locations adjacent the conveyor for various operations. For example, article groups being transported on a conveyor can initially be provided with a packaging structure and have specific processing steps performed. Thereafter, the partially packaged moving article unit is engaged and rotated on the conveyor to a predetermined orientation to expose other packaging structure areas for further manipulation. Thus, the article rotating assembly of this invention provides structures and processes which enable the reorientation of articles or article groups on a conveyor for further operations by associated machinery on the articles or on the packaging structures previously placed on the articles.

SUMMARY OF THE INVENTION

The present invention provides an article rotating assembly for rotating articles to a predetermined position on a moving conveyor. The assembly comprises a frame structure with a pair of vertically disposed drive shafts each having a sprocket mounted at the top and bottom, and an upper and lower continuous chain for engaging the sprockets and synchronized drive means. A first continuous cam guide structure is mounted to the frame adjacent and peripheral to the upper continuous chain and has outwardly and inwardly sloping sections at predetermined locations along its path. A second continuous cam guide structure is mounted to the frame and is generally in a parallel plane to the first cam guide structure and has downwardly and upwardly sloping sections at predetermined locations along its path. A plurality of vertical flight shafts are connected between the upper and lower continuous chains. An upper rotating block structure is mounted to the upper chain and has a first cam follower extending therefrom and is positioned for movement in the first cam guide structure and has a keyed bore vertically extending thereinto. An elongated piston shaft with a sliding block structure is constructed and arranged for slidingly engaging at least one vertical flight shaft, the sliding block structure also has a second cam follower mounted thereto for movement in the second cam guide structure. An article engaging or control structure is connected to the bottom of the elongated piston shaft, which has a keyed upper end portion for slidingly and matingly engaging the keyed bore in the upper block structure. The article control structure is positioned for vertical movement above the moving conveyor, whereby the downward movement of the article control structure results from the second cam follower movement in the second guide track and whereby the rotation of the upper block structure results from the first cam follower movement in the first cam track. The cooperating action of the cam followers provides for the downward movement and rotation of articles by the article control structure on a moving conveyor.

These and other benefits of this invention will become clear from the following description by reference to the drawings.

DESCRIPTION OF THE PREFERRED EMBODIMENT

Figure 1:
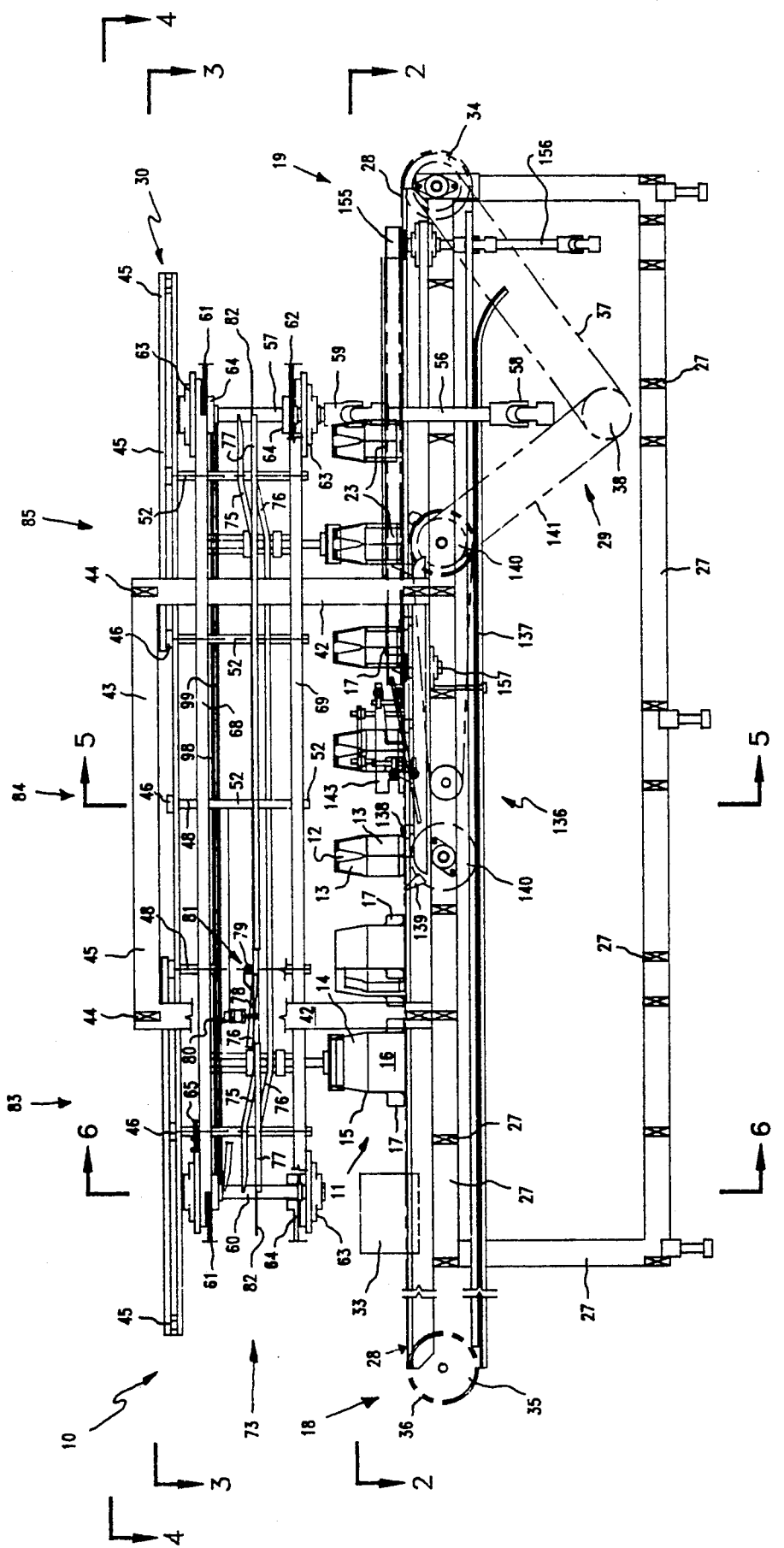
FIG. 1 is a back side view of an article rotating assembly of the present invention.

The assemblies and process of the present invention are for rotating articles to a predetermined orientation during high speed conveyance in a continuous process. As shown in the drawing figures, the apparatus and method are particularly useful in a packaging carton closure operation, and in cooperation with synchronized, related packaging apparatus located at its upstream and downstream ends. The assembly and process provide reliable rotation of the cartoned articles during conveyance at relatively high speeds in the continuous packaging operation, so that predetermined areas of the carton are exposed and made accessible to flap closure processing, for example, from locations adjacent the conveyor.

Figure 2:
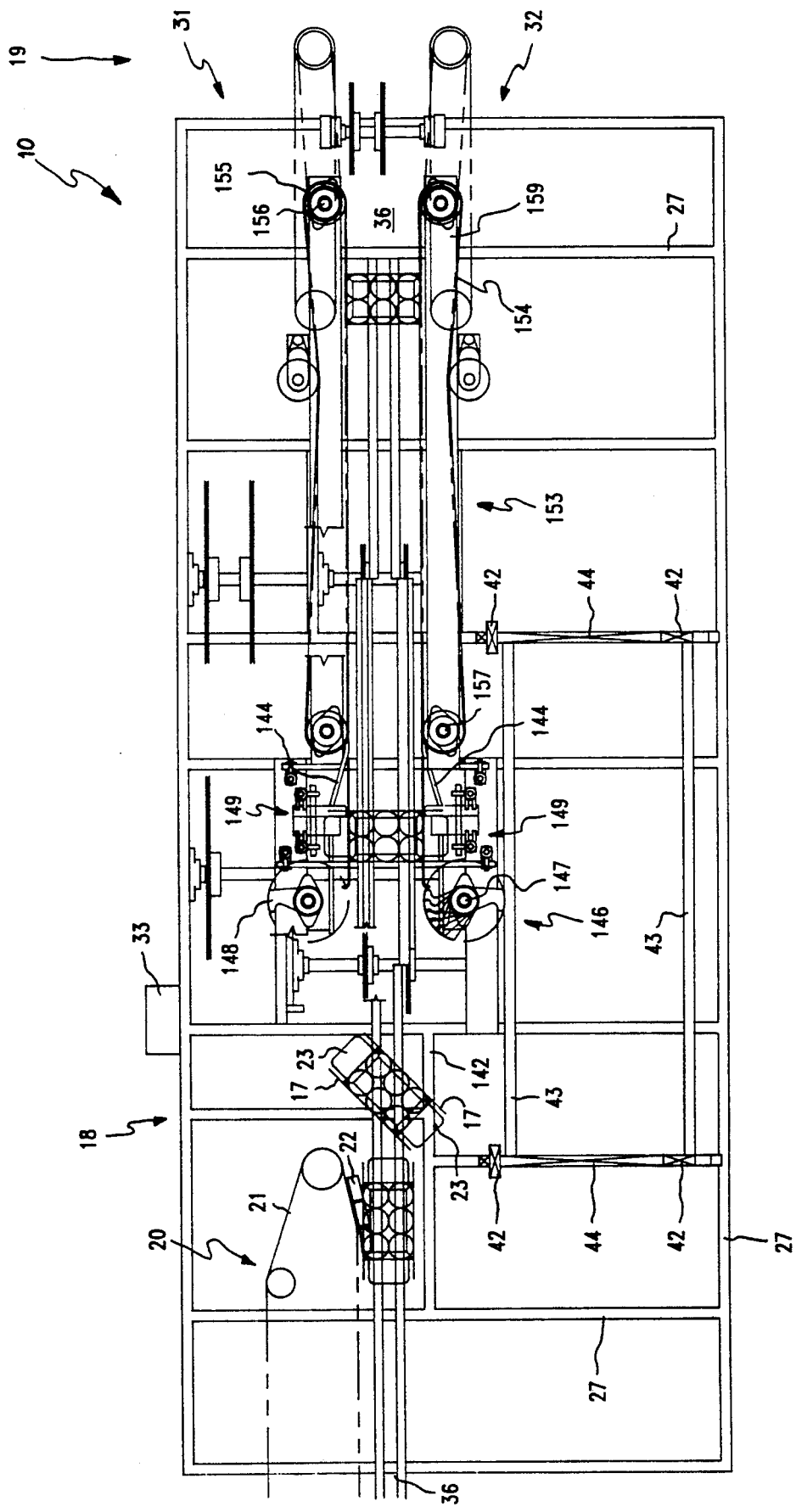
FIG. 2 is a top plan view of the article rotating assembly, taken along line 2—2 of FIG. 1.
Figure 3:
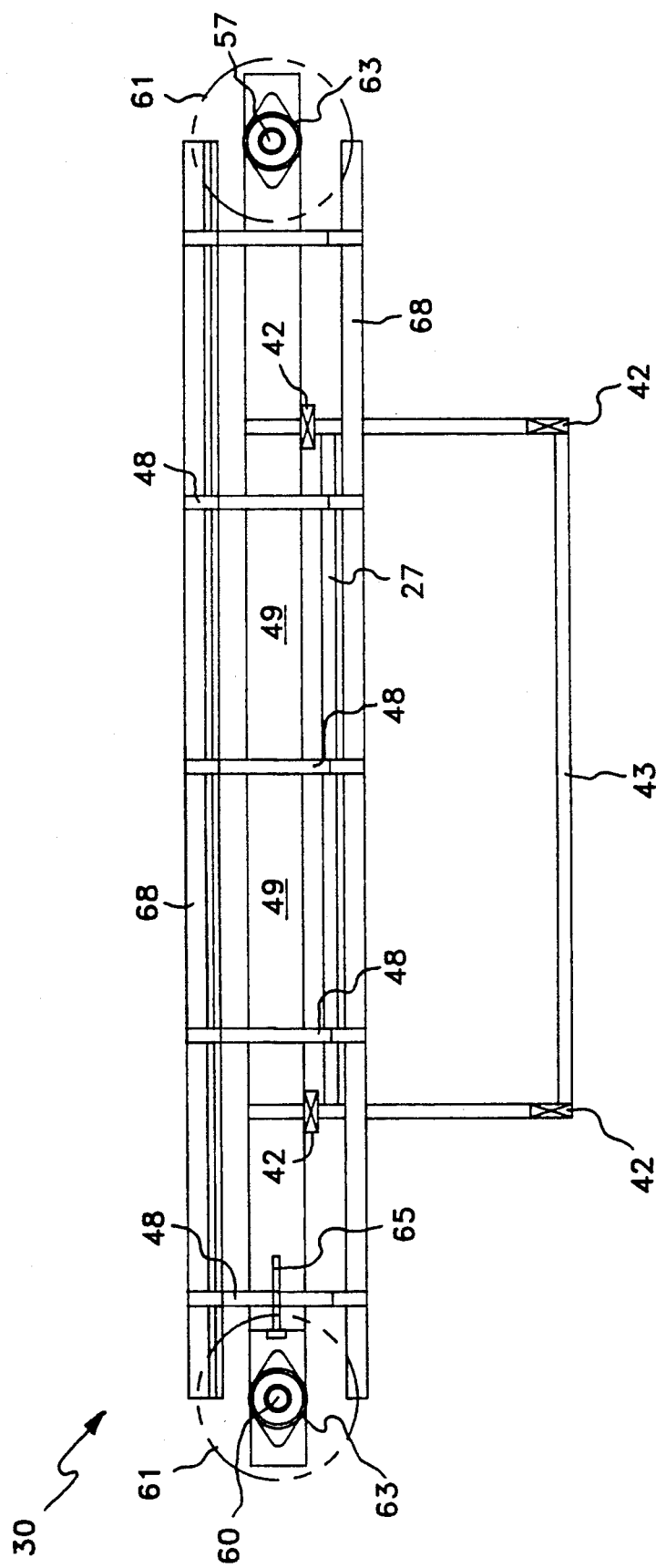
FIG. 3 is a top view of the article rotating assembly, taken along line 3—3 of FIG. 1.

Referring to FIGS. 1 and 2, the article rotating assembly 10 generally Comprises a base frame structure 27 constructed of a plurality of interconnected, rigid vertical and horizontal frame members, a conveyor 28 oriented generally in the top area, of the base frame structure 27 and running longitudinally from an input end 18 to an output end 19, a carousel rotating structure 30 located above or overhead of the conveyor 28, and a drive mechanism 29 which synchronously powers both the conveyor 28 and the carousel rotating structure 30. The article rotating assembly 10 further has an electronic control module and panel 33 which houses the instruments by which the operator monitors and controls the operation of the assembly 10.

In general, the system 10 functions to rotate longitudinally or length-wise oriented articles 11 in a stream of articles fed in at the input or upstream end 18 to a normal or width-wise orientation for processing and ejection at the output or downstream end 19. As shown, the articles 11 are rotated 90 degrees in the instant process. However, it is within the purview of this invention that article rotation may be accomplished through a range of angles from 1 to 360 degrees. Additionally, although the articles 11 as shown, and as will be further described, are processed prior to output, they may be output prior to such processing. Typically, the assembly and process of this invention are utilized in a continuous process, such as the instant packaging process or other manufacturing process, for example. Also, the assembly and process will typically be preceded and succeeded by respective upstream and downstream apparatus and methods. Importantly, the articles 11 are input in a metered or otherwise synchronized manner.

In the instant example, the assembly 10 is preceded by a packaging cartoning or sleeving device 20 such as that produced by Applicants assignee, including an output conveyor 21 with metering lugs 22. Product groups, such as six-packs of fluid filled bottles 13, are partially encased by packaging material, such as a paper board carton or sleeve 12 to form articles 11 which are then input to the assembly 10. The sleeves 12 are spaced apart a predetermined distance and are longitudinally oriented on the conveyor 28. The sleeves 12 have leading and trailing ends 14 and 15, and side panels 16. The sleeve ends 14 and 15 are each shown to have open or unassembled vertical end flaps 17 and a horizontal bottom flap 23. In the instant example, the article will be rotated so that the leading and trailing ends 14 and 15 may be closed by associated processing equipment located adjacent the conveyor 28 sides, as discussed further below. The rotated and processed articles 11 are shown to be output by the assembly 10 in a lateral or normal orientation with respect to the conveyor. Alternatively, the assembly 10 may be configured to rotate the articles 11 back to a longitudinal or other orientation prior to output.

Returning to a discussion of the structural elements of the assembly 10, the conveyor 28 as shown in FIGS. 1 and 2 includes an endless conveyor belt 36 which is approximately the width of carton 11 and which is preferably constructed of a plurality of linked plastic segments. The belt 36 is shown to revolve around a drive pulley 34 and an idler pulley 35 disposed at opposing ends of the assembly 10. A drive belt 37 links the drive pulley 34 to a central power source 38, such as an electric motor (not shown). The power source 38 is controlled via the control module 33 and is further communicatively connected to machine shut-down devices as discussed below. The conveyor 28 rate is variable and has a speed sufficient to convey approximately 200 articles per minute.

Figure 4:
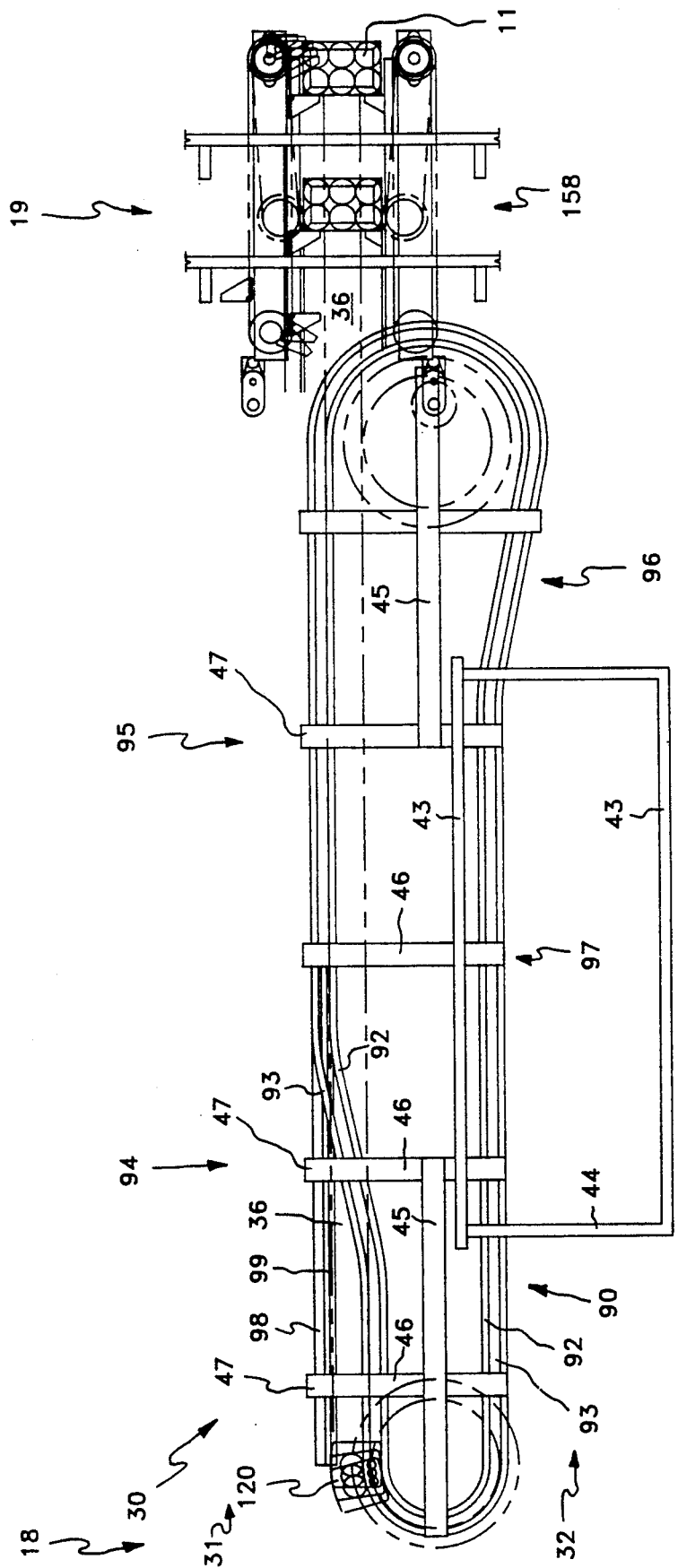
FIG. 4 is a top view of the article rotating assembly, taken along line 4—4 of FIG. 1.
Figure 5A:
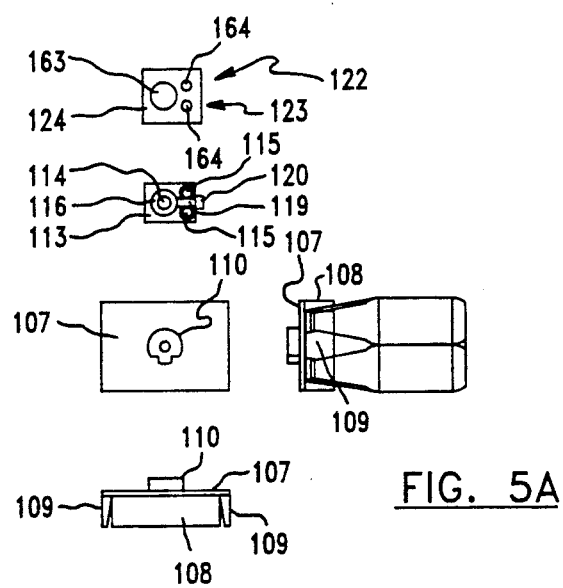
FIG. 5a is an exploded view of the article control structure shown in FIG. 5.
Figure 5:
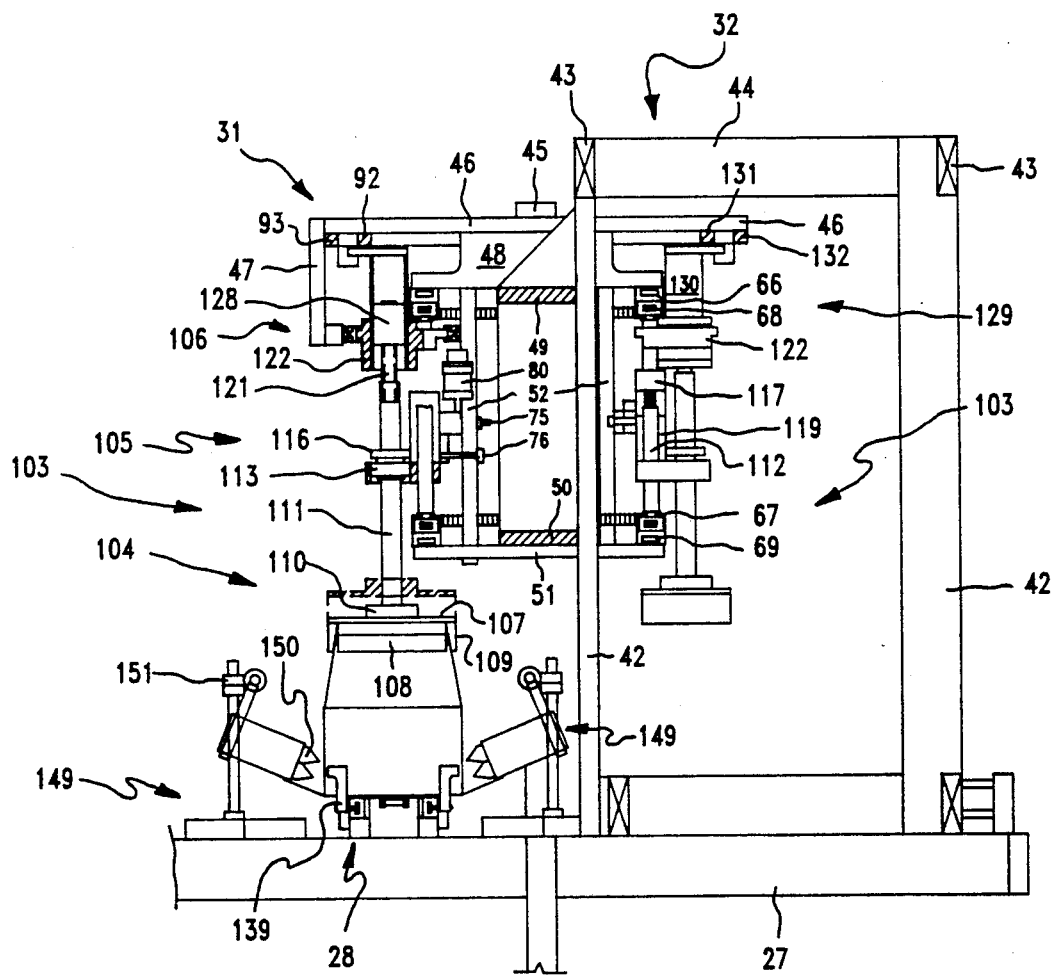
FIG. 5 is an end view of the article rotating assembly, taken along line 5—5 of FIG. 1.
Figure 6:
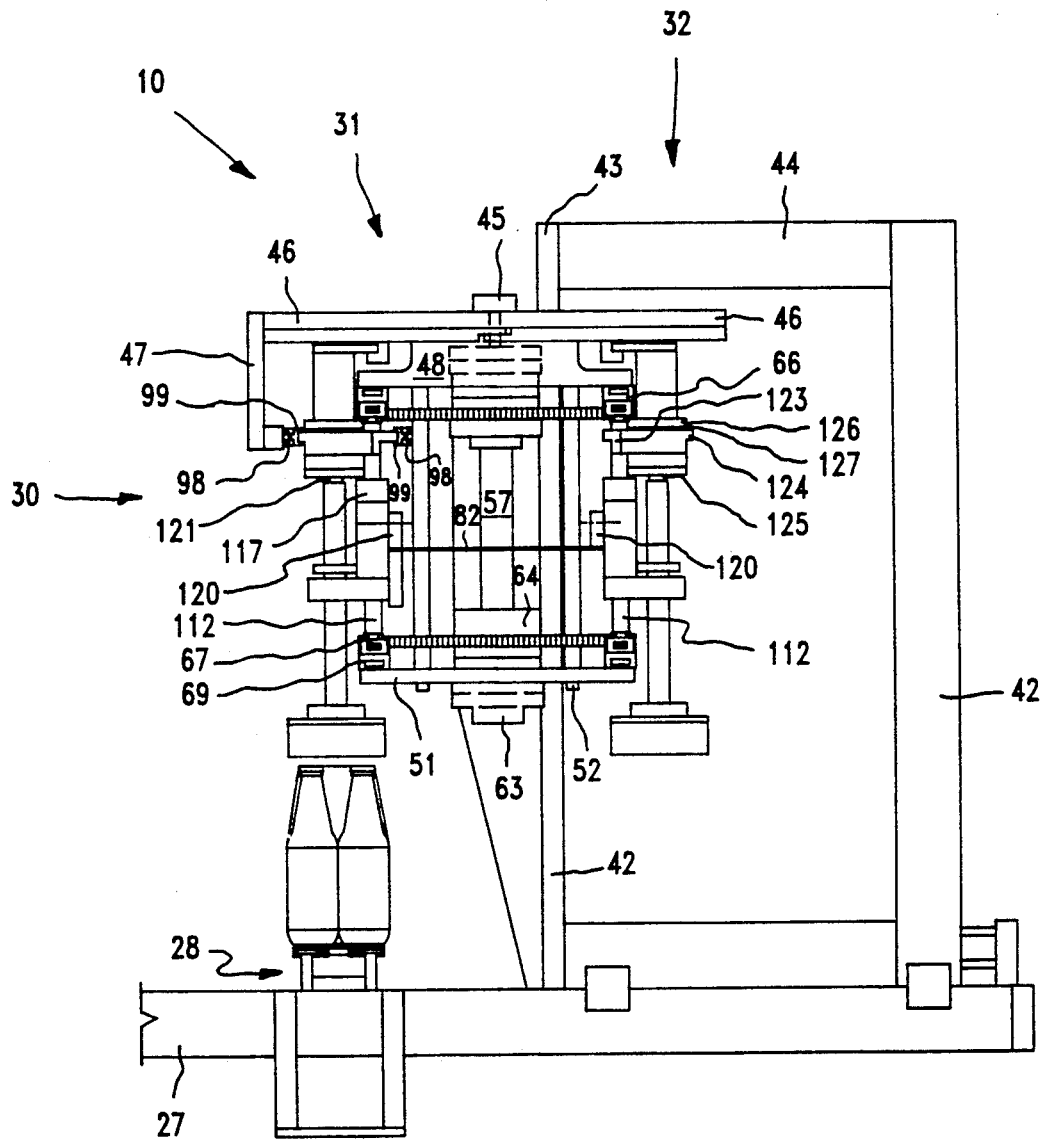
FIG. 6 is an end view of the article rotating assembly, taken along line 6—6 of FIG. 1.

Referring also to FIGS. 3-7, the overhead carousel rotating structure 30 generally comprises an upper frame structure which is mounted on top of the device 10 base frame structure 27, a plurality of article control mechanisms 103, spaced at predetermined intervals throughout the structure 30, a vertical control cam track 73, and a substantially coextensive rotational control cam track 90. A drive mechanism powers the overhead carousel rotating structure 30 in synchronization with the article conveyor 28. As best shown in FIGS. 4 and 6, the overhead carousel rotating structure 30 has a carousel-like, endless horizontal travel path with opposing semicircular ends and elongated generally linear side portions between the ends. One side 31, hereinafter referred to as the active side, is located directly and spatially above the conveyor 28. Article control mechanisms 103 traveling on the active side 31 move in the same direction and speed as the conveyor 28 to rotate articles 11 located thereon. The opposite side 32, hereinafter referred to as the return side, moves article control mechanisms 103 in the opposite direction as that of the conveyor 28. The return side 32 is utilized to return article control mechanisms 103 from the output end 19 to the input end 18 in a continuous manner. The operation rate of the overhead carousel rotating structure 30 is directly proportional to the velocity of the conveyor 28.

The upper frame structure of the overhead carousel rotating structure 30 is shown to include upright members 42 which support a set of cross bars 43 and 44. A pair of longitudinally oriented horizontal beams 49 and 50 are supported by this frame structure. Laterally oriented bottom rail support brackets 51 are connected to the lower horizontal beams 50 at spaced predetermined intervals. Laterally oriented I-shaped top rail support brackets 48 are shown to be mounted to the top horizontal beam 49, and aligned above the bottom rail support brackets 51. Also as shown, a plurality of vertical rail supports 52 are connected between the top and bottom rail support brackets 48 and 51. The vertical rail supports 52 are oriented in pairs and parallel to one another with respect to a lateral plane of the assembly 10. Referring particularly to FIGS. 4 and 6, lateral top cam support bars 46 are connected to the top surface of the top rail support brackets 48. Also, longitudinal top cam support bars 45 are shown bolted to and extending from the lateral cam support bars 46 nearest each end of the assembly 10. Finally, a track connector bracket 47 is shown connected to each extended end of each lateral top cam support bar 46 at its end which is extended to the active side 31 of the assembly 10. The track connector brackets 47 depend downwardly a predetermined distance from their points of connection.

Referring to FIGS. 1 and 6, the drive mechanism of the overhead carousel rotating structure 30 generally comprises a lower drive shaft 56 and associated U-joints 58 and 59, a pair of vertically oriented drive and idler sprockets 61 and 62, and a pair of flight chains 66 and 67 or other endless means. The lower drive shaft 56 is connected to the main power supply via means known in art to synchronize the operation of the overhead carousel rotating structure 30 with the conveyor 28.

The lower sprockets 62 are mounted for rotation proximate opposing ends of the lower horizontal beam 50, on its upper side, via a bearing group 63 and a hub clamp 64. Similarly, the upper sprockets 61 are mounted for rotation proximate opposing ends of the upper horizontal beam 49, on its lower side, coaxially with the lower sprockets 62, also via a bearing group 63 and hub clamp 64. The drive sprockets 61 and 62 are coaxially linked via the upper drive shaft 57, while the idler sprockets 61 and 62 are linked via the idler shaft 60. Preferably, a chain tension adjustment mechanism 65 is connected to the bearing groups 63 of the idler sprockets 61 and 62 to enable adjustment of chain 66 and 67 tension. Elongated, tubular upper and lower chain guides 68 and 69 are mounted to the bottom and top ends of the top rail support brackets 48 and bottom rail support brackets 51, respectively, to maintain linearity of the chains 66 and 67.

The vertical control cam track 73 of the overhead carousel rotating structure 30 controls the relative vertical motion or behavior of the article control mechanisms 103. The vertical control cam track 73 has a generally circular configuration with respect to the horizontal plane of the structure 30 and has curved portions at two ends, and parallel, substantially rectilinear portions extending along the active and return sides 31 and 32 of the structure 30. With respect to the vertical plane of the structure 30, the active side 31 has a plunging segment 83 with a predetermined slope and length located proximate the input end 18 of the assembly 10 and a rising or lift-off segment 85 also with a predetermined slope and length, located proximate the output end 19. The vertical contours of these segments correspond to the relative vertical movement imparted to the article control mechanisms 103. Thus, variation of differential heights provided by the plunging and rising segments 83 and 85 will affect corresponding changes in the vertical levels of the article control mechanisms 103. A substantially flat, horizontal dwell segment 84 separates the plunging and rising segments 84 and 85. The return side 32 of the vertical control cam track 73 and both end portions are also substantially horizontal.

With particular reference to FIG. 1, a front track group 74 is located along the length of the active side 31 and comprises upper and lower tracks 75 and 76. The upper track is preferably tapered at its ends. A single rear track 77 extends along the return side 32 of the structure 30. A semicircular cam plate 82 is located at each end of the structure 30 and is horizontally coplanar with rear track 77 and the end areas of the lower track 76 of the front track group 74.

The top track 75 of the front track group 74 has a releasable track segment 78 of a predetermined length which is located proximate the end of plunging segment 83. The releasable segment 78 is connected at its far end to the remaining track 75 via a pivot point 79 which allows the segment 75 to pivot upwardly there about. Its near or opposite end is normally held down so as to be coplanar with its immediately adjacent track 75 portion via a pressure cylinder and associated piston 80. In the event that a plunging article control mechanism 103 encounters a resistive force and is thereby prevented from further downward motion, for example, in the case where the article control mechanism 30 is improperly aligned with a corresponding article 11, it exerts an upward force on the top track 75. This upward force on the top track 75 is sensed by a capacitive proximity switch 81 or the like which signals the pressure cylinder 80 to release and permit the releasable segment 78 to pivot upwardly, thereby relieving the upward force exerted by the article control mechanism 103 on the top track 75. Simultaneously, the proximity switch 81 signals the assembly controller 33 to disengage the entire system so that the misalignment or other problem can be corrected.

The rotational control cam track 90 of the overhead carousel rotating structure 30 controls the relative rotational motion or behavior of the article control mechanisms 103. Referring particularly to FIG. 4, the rotational control cam track 90 is located at the top of the structure 30 and also has a generally circular configuration with respect to the horizontal plane of the structure 30. The rotational control cam track 90 has curved portions at its two ends and generally linear and parallel elongated portions extending along the active and return sides 31 and 32 of the structure 30. With respect to the vertical plane of the structure 30, the rotational control cam track 90 is substantially planar and horizontally oriented.

Still referring to FIG. 4, the rotational control cam track 90 has an outwardly sloped rotation segment or region 94 of a predetermined configuration and length located on the active side 31, proximate the input end 18. The slope and length of the rotation segment 94 provide a proportional rotation to the article control mechanisms 103 as will be described further below. Importantly, these parameters are variable to affect precise rotational control of the article control mechanisms 103. Relative to the plunging segment 83 of the vertical control cam track 73, the rotation region 94 is oriented in a posterior or later occurring position along the active side 31. Thus, the individual article control mechanisms 103 encounter and are controlled by the rotation segment 94 subsequent to being moved downward and into contact with corresponding articles 11 by the plunging segment 83 of the vertical control cam track 73. A dwell region 95 is disposed downstream of the rotation region 94. The dwell region 95 is a region of substantially zero horizontal slope with respect to the travel path of the article control mechanisms 103. A reset region 96 of a predetermined length and slope is shown along the beginning of the return side 32. In the instant example, the reset region 96 length and slope provide counter rotation to the article control mechanisms 103 to return them to their pre-rotated orientation, in this example, 90 degrees. Finally, a return segment 97 is shown which imparts no rotation to the article rotation mechanisms 103 during their transport to the rotation region 94.

The rotational control cam track 90 comprises a pair of spatially parallel, inner and outer tracks 92 and 93, which are separated a predetermined distance. Each track 92 and 93 is suspended from and connected to the bottom surface of the lateral top cam support bars 46, proximate their ends. The portions of the rotational control cam track 90 located at the ends of the overhead carousel rotating mechanism 30 are further shown suspended from the end regions of the longitudinal top cam support bars 45.

The overhead carousel rotating mechanism 30 is further shown to comprise a guide rail consisting of rectilinear, tubular and rigid inner and outer rails 98, each having a nylon slide surface 99, and which are located along the length of the active side 31. The inner rail 98 is supported by the vertical rail support 52, and the outer rail 98 is supported by the track connector bracket 47. The two rails 98 are spacially parallel and separated by a predetermined distance. The opposing tracks 98 provide vertical stabilization for the top portion of the article control mechanism 103 as discussed below.

Referring to FIGS. 5 and 6, the article engaging structures or control mechanisms 103 are spaced at predetermined intervals about the entire overhead carousel rotating structure 30, which intervals correspond to the distance between articles 11 spaced apart on the conveyor 28. Generally, in use the mechanisms 103 are aligned with the articles 11 at the input end 18, vertically lowered to engage the articles 11 through the plunging section 83 of the vertical control cam track 73, rotate the article 11 a predetermined angle (i.e. 90 degrees) through the rotational active segment 94 of the rotational control cam track 90, release the article 11 through the rising segment of cam track 73, and finally are rotationally reset and returned from the output end 19 along the return side 32 to the input end 18. As previously discussed, vertical and rotational movement of article control mechanisms 103 are functions of the characteristics of the active segments of the cam tracks 73 and 90, respectively.

Each article control mechanism 103 is constructed of essentially three elements which enable it to cooperate with the control cams 73 and 90 and to engage an article 11, namely, a sleeve contacting assembly 104, a vertical cam follower assembly 105, and a horizontal cam follower assembly 106. The sleeve contacting assembly 104 consists of a piston shaft 111, to which is connected a turning plate 107 having four peripheral downwardly depending pack guides 108 and 109. The piston shaft 111 is preferably a rigid metal cylindrical shaft with a smooth bearing surface and having a predetermined length. The turning plate 107 is shown to be a rectangular metal plate, which is connected at the lower end of the piston shaft 111 via a slotted clamp hub 110. The clamp hub 110 allows adjustment of the orientation of the turning plate 107. As shown, the turning plate 107 has a long (length) side and a short (width) side. Importantly, the plate 107 dimensions correspond to the sleeve 12 top dimensions and the article 11 upper surface. The longitudinal and lateral pack guides 108 and 109 are shown connected to the periphery of the flat plate 107 surface, via screws. The pack guides 108 and 109 have a predetermined length sufficient to engage the top-side areas of the articles 11 for rotation. Preferably, the guides 108 and 109 are constructed of nylon or a similar material, and have beveled inward bottom edges to facilitate sliding engagement with the top portions of article or article groups 11. Although specific structure for the sleeve contacting assembly 104 is shown for use with the particular articles 11 present in the instant example, numerous modifications can be made, consistent with the overall invention, for use with a variety of article configurations and sizes.

Figure 7:
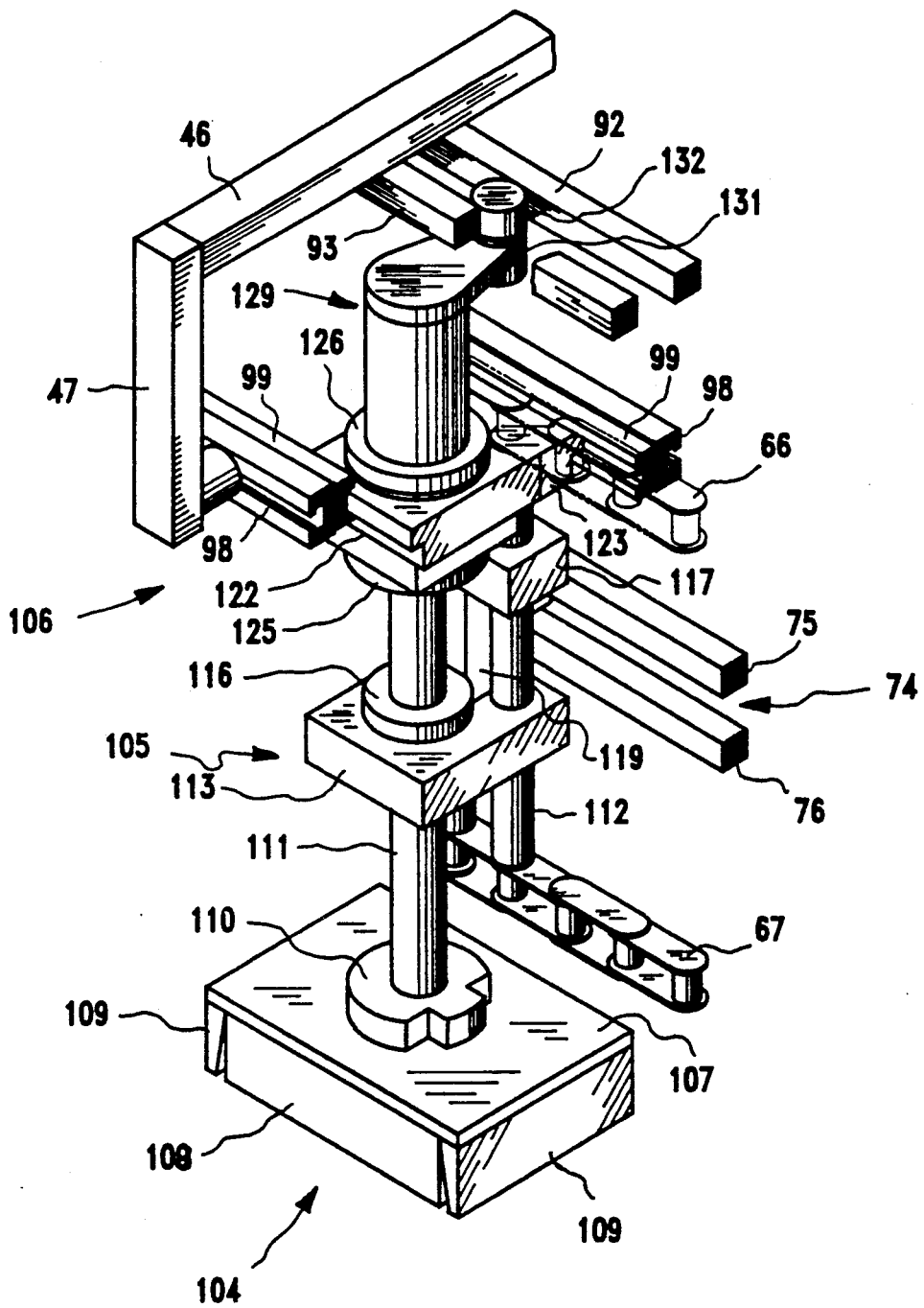
FIG. 7 is a perspective view of the article control structure of the assembly of this invention.

Referring also to FIGS. 5a and 7, the vertical cam follower or motion assembly 105 basically comprises a pair of flight shafts 112, a lower bushing block 113, an upper bushing block 117, and a spreader bar 119 with an attached cam follower (roller) 120. The flight shafts 112 are metal cylindrical rods of a predetermined length with a bearing-type surface. The flight shafts 112 are aligned vertically and spacially parallel with one another, and are attached at their upper and lower ends to predetermined link plates of the upper and lower flight chains 66 and 67. As shown, the distance separating the flight shafts 112 is approximately two inches. The dual flight shafts 112 provide a stable, translatable mounting surface upon which the remaining elements of the vertical cam follower assembly 105 are vertically slidable. And, the carousel type movement of the flight chains 66 and 67 results in a corresponding horizontal translation of the overall article control mechanism 103 via the connection means described below.

The lower bushing block 113 links the piston shaft 111 to the flight shafts 112. The lower bushing block 113 is a substantially square metallic structure which has a relatively large piston shaft aperture 114 and a pair of flight shaft apertures 115. The flight shafts 112 slidably extend through the apertures 115. The piston shaft aperture 114 has a bearing assembly 116 coaxially disposed and held within it. The piston shaft 111 extends through the bearing assembly 116 and is fixed at a predetermined point via set screws in the bearing assembly 116. Thus, in an operative condition, the attached piston shaft 111 will move vertically with the lower bushing block 113 along the flight shafts 112, while at the same time, it is allowed to rotate within the piston shaft aperture 114 of the bearing assembly 116.

The upper bushing block 117 is a rectangular metallic block having a pair of vertical apertures through which the flight shafts 112 extend. The upper bushing block 117 is disposed above the lower bushing block 113 so that its apertures are aligned with the apertures 115 of the lower bushing block 113. The upper bushing block 117 serves as a connection means for the spreader bar 119 and provides stability to group of vertical cam follower assembly 105 elements which vertically oscillate on flight shafts 112. The spreader bar 119 is a slightly elongated rectangular metallic block which is disposed and rides between the two flight shafts 112, and which is connected at its top and bottom ends to the upper and lower bushing blocks 117 and 113, respectively. The vertical cam roller 120 is connected to a back side of the spreader bar 119 at approximately its midpoint. Thus, vertical movement of the cam follower 120 in the vertical control cam track 73 is translated via the spreader bar 119 to the lower bushing block 113, and hence to the piston shaft 111. The upper bushing block 117 provides stability to the vertical cam follower assembly 105, in cooperation with the lower bushing block 113.

The horizontal or rotational cam follower or motion assembly 106 cooperates with the vertical cam follower assembly 105 to rotate the sleeve contacting assembly 104. It basically comprises a shaft guide block 122, a ball bearing spline 128, and a cam arm 129, including a rotational cam follower (roller) 132. The shaft guide block 122 provides a structure which travels around the overhead carousel rotating structure 30 in a constant, level and horizontal plane, which allows the upper end of the piston shaft 111 to oscillate vertically within its structure under the control of the vertical control cam track 23, and which facilitates mating contact between the piston shaft 111 upper end, the ball bearing spline 128 and the cam arm 129 for rotational function. The shaft guide block 122 has a generally square top profile and is preferably constructed of aluminum or the like. The shaft guide block 12 is shown to be constructed of two members, the inner member of which is bolted to the outer member and forms an inwardly facing extension 123 at the top of the block 122. A corresponding outer extension 124 is disposed on the opposite top edge and faces outwardly. These extensions 123 and 124 seat within the nylon tracks 99 of the guide rails 98 to maintain its horizontal planar position and prevent vertical motion. The shaft guide blocks 122 also have a pair of vertically disposed apertures 164 through which the flight shafts 112 extend to ultimately connect with their respective chains 66 and 67. Thus, the shaft guide block 122 and associated horizontal cam follower 106 assembly elements are translated horizontally in conjunction with the flight chains 66 and 67, via the flight shafts 112.

The shaft guide block 122 further has a vertical aperture 163, generally centrally located, into which the top end of the piston shaft 111 is inserted from the lower end, and into which is inserted a lower portion of the ball bearing spline 128 from the upper end. A first set screw collar 125, with thrust washer 127, is coupled to the lower end of the aperture 163, and a second set screw collar 126, with thrust washer 127, is coupled to the upper end.

The cam arm 129 is attached to the top side of the shaft guide block 122, coaxially with the aperture 163 via the upper set screw collar 126. The set screw allows adjustment of the rotational orientation therebetween. The cam arm 129 is preferably constructed of metal and has an upright cylindrical member 130, a horizontal arm 131 disposed at the top of the cylindrical member 130 and extending radially outward a predetermined distance approximately two inches, and the cam roller 132 which is vertically oriented and attached to the top side of the extended arm 131. The cam roller 132 is operatively disposed between the rails 92 and 93 of the rotational control cam track 90.

The ball bearing spline 128 is a rigid cylindrical, metallic structure with a central, axially splined or keyed bore or hub, including ball bearings. The top end of the piston shaft 111 has a corresponding axially splined shaft end 121 which mates with the ball bearing spline bore 128. The mated pair provide both transmission of rotation and vertical translatory motion along the axis of the shaft 121. Thus, rotary motion imparted to the cam arm 130 by the rotational control cam track 90 is conferred, via the spline 128 and shaft 121, to the piston shaft 111. Subsequently, and even simultaneously if required by the particular application of this assembly 10, the piston shaft 111 is permitted to vertically oscillate under control of the vertical control cam track 73.

The article rotating assembly 10 as shown has various associated equipment necessary for the flap closure process and continuous packaging processes of the instant example. Referring to FIGS. 1 and 2, a carton stabilizing mechanism 136 stabilizes the carton structure immediately subsequent to a gluing step. The stabilizing mechanism 136 generally comprises a horizontal conveyor belt 137 which operates in-line with the assembly conveyor 28. The endless belt 137 rotates about pulleys 140 which are powered in a drive belt 141. Leading and trailing lugs 138 and 139 spaced at predetermined intervals engage predetermined points on the bottom of the carton side panels 16 to maintain proper squared alignment of the carton 12 subsequent to gluing.

Preferably, side dead plates 142 are disposed adjacent the conveyor belt 36, just prior to the stabilizing mechanism 136 in the region where the articles 11 undergo rotation. Also in this region, a bottom flap plow 143 forces the sleeve bottom flaps 23 upward during conveyance prior to gluing. Side bottle ejection detection arms 144 are disposed adjacent the conveyor 28 and are connected to a proximity switch to deactivate the assembly 10 in the case of a defective carton or ejected container 13.

FIGS. 1 and 2 also show a side flap tucker mechanism 146 including tucker arms 148 rotating about vertical shafts 147 disposed adjacent the conveyor 28. This mechanism closes the carton side flaps 17 prior to gluing. A gluer mechanism 149, including glue ejectors 150 located on adjustable post structures 151, is shown disposed immediately down stream of the flap tuckers 146. Preferably, the gluer mechanism 149 is activated via a photo eye or the like. A gluer side belt mechanism 153 is shown for holding the side and bottom flaps 17 and 23 of each carton 12 in position for a predetermined time period subsequent to gluing. The mechanism 153 comprises horizontally moving, vertically oriented endless conveyor belts 154 disposed in close proximity to both sides of the conveyor 28, which rotate about pulleys 155 revolving about vertically disposed drive and idler shafts 156 and 157. Stationary backing plates 159 are disposed immediately behind the belt 154 segment proximate the conveyor 28 to maintain contact between the belt 156 surface and the carton flaps 17 and 23. Finally, an article output processing apparatus 158, such as a labeling mechanism or the like, is shown disposed at the output end 19 of the article rotating assembly 10.

Although the assemblies are described herein in horizontal and vertical orientations, these spatial configurations are exemplary only. It is within the purview of this invention that such components can be oriented in different planes and it is their relative positioning that is of importance only.

As many changes are possible to the embodiments of this invention utilizing the teachings thereof, the descriptions above, and the accompanying drawings should be interpreted in the illustrative and not the limited sense.

THAT WHICH IS CLAIMED IS:

1. An article rotating assembly for rotating articles to a predetermined position on a moving conveyor comprising:
   a) a frame structure with a pair of vertically disposed rotatable shafts each having a sprocket mounted at the top and bottom thereof, an upper and lower continuous chain for engaging said sprockets and synchronized drive means;
   b) a first continuous cam guide structure mounted to said frame adjacent and being generally peripheral to said upper continuous chain and further having outwardly and inwardly sloping sections at predetermined locations along its path;
   c) a second continuous cam guide structure mounted to said frame and being generally in a parallel plane to said first cam guide structure and further having downwardly and upwardly sloping sections at predetermined locations along its path; and d) article engaging means further comprising:
  i. at least one vertical flight shaft connected between said upper and lower continuous chains;
  ii. an upper rotating block structure connected to at least one flight shaft and having a first cam follower extending therefrom and positioned for movement in said first cam guide structure and further having a keyed bore vertically extending thereinto;
  iii. an elongated piston shaft having a sliding block structure constructed and arranged for slidingly engaging at least one said vertical flight shaft, said sliding block structure further having a second cam follower mounted thereto for movement in said second cam guide structure; and
  iv. a product control structure connected at the bottom of said elongated piston shaft, said piston shaft having a keyed upper end portion for slidingly and matingly engaging said keyed bore in said upper block structure, said product control structure being positioned for vertical movement above the moving conveyor, whereby the downward movement of said product control structure results from said second cam follower movement in said second cam guide structure and whereby the rotation of said upper rotating block structure results from said first cam follower movement in said first cam guide structure to provide for the downward movement and rotation of articles on the moving conveyor by said product control structure.

2. The article rotating assembly of claim 1, wherein said upper rotating block structure has an arm and wherein said first cam follower is mounted to said arm and wherein said second cam follower is mounted to the rear of said sliding block structure of said piston shaft.

3. The article rotating assembly of claim 2, wherein said upper rotating block structure has a stabilizing guide block member mounted for rotation thereto and wherein a slide rail structure is mounted to said frame adjacent and spatially parallel a predetermined portion of said conveyor, said slide rail structure for receiving and guiding said stabilizing block to maintain horizontal motion of said upper rotating block structure.

4. The article rotating assembly of claim wherein said second continuous cam guide structure is a rail structure having a parallel rail configuration portion and wherein said parallel rail portion has shut-off means for disengaging said second cam follower responsive to excessive pressure on the downward movement on said product control structure.

5. The article rotating assembly of claim 1, wherein said upper rotating block structure is adjustable with respect to said first cam guide structure, wherein said product control structure is adjustable with respect to said sliding block structure and with respect to said piston shaft.

6. The article rotating assembly of claim 5, wherein said product control structure is comprised of a generally flat plate having beveled peripheral guide members extending downwardly therefrom for engaging an article or article group.

7. In an article conveyance assembly having conveyance means, an article rotating assembly comprising:
a) article engaging means,
b) vertical motion means operative on said article engaging means, and
c) rotational motion means operative on said article engaging means, said rotational motion means comprising a first cam track and cam roller assembly and said vertical motion means comprising a second cam track and cam roller assembly, said second cam track having derailment means activatable at a predetermined resistance force on said article engaging means, said vertical and rotational motion means being synchronized with said conveyance means.

8. The assembly of claim 7, wherein said article engaging means is comprised of a piston shaft having a product engaging structure attached at the bottom end thereof, said piston shaft being connected to said vertical and rotational motion means.

9. The assembly of claim 7, wherein said vertical and rotational motion means are synchronized with said conveyance means and wherein said vertical motion means is synchronized with said rotational motion means.

10. The assembly of claim 7, wherein said article engaging means, said rotational motion means and said vertical motion means are adjustable.

11. The assembly of claim 7, wherein said article conveyance assembly further has a frame and wherein said first cam track is mounted to said frame and further has an endless cam roller path with at least two divergent paths and wherein said second cam track is mounted to said frame and wherein said second cam track has an endless cam roller path with at least one vertically sloping portion.

12. The assembly of claim 7, wherein said vertical motion means is operative before said rotational motion means is operative.

13. The assembly of claim 7, wherein a packaging sleeve is wrapped over each article on said conveyance means.

14. The assembly of claim 13, wherein said article engaging means holds the packaging sleeve unitary with each article while rotating each article on said conveyance means.

15. The assembly of claim 7, further comprising a frame structure, a pair of driven endless chains disposed in generally parallel panes within said frame structure, a plurality of vertically disposed flight shafts connected between said chains, an upper rotating block having said first cam roller attached thereto and being connected to said flight shafts, a sliding block structure constructed and arranged for vertical movement with respect to said flight shafts and having said second cam roller attached thereto and further having a piston shaft fixed thereto, said article engaging means being mounted at the bottom end of siad piston shaft.

16. The assembly of claim 15, wherein said upper rotating block has a vertically extending splined interior aperture and wherein said piston shaft has a splined upper end portion for slidingly engaging the splined interior of said upper rotating block.

17. The assembly of claim 16, wherein said first cam roller is positioned for movement in said first cam track and wherein said second cam follower is positioned for movement in said second cam track, said first cam track further having a predetermined track path to impart rotational movement to said upper block and said second cam track having a predetermined track path to impart vertical movement to siad sliding block.

18. In an article conveyance assembly having conveyance means, an article rotating assembly comprising:
a) a frame structure,
b) a pair of driven endless chains disposed in generally parallel planes within said frame structure,
c) article engaging means,
d) vertical motion means, including a lower cam track, operative on said article engaging means,
e) rotational motion means, including an upper cam track, operative on said article engaging means, said vertical and rotational motion means being synchronized with said conveyance means,
f) vertically disposed flight shafts connected between said chains,
g) an upper rotating block having a vertically extending splined interior aperture and a first cam roller attached thereto, said upper rotating block being connected to said flight shaft, and
h) a sliding block structure constructed and arranged for vertical movement with respect to said flight shafts and having a second cam roller attached thereto and further having a piston shaft coupled thereto, said piston shaft having a splined upper end portion for slidingly engaging said splined interior of said upper rotating block, said article engaging means being mounted at a bottom end of said position shaft.

* * * * *